United States Patent [19]
Lai et al.

[11] Patent Number: 5,969,076
[45] Date of Patent: Oct. 19, 1999

[54] THERMOPLASTIC SILICONE-CONTAINING HYDROGELS

[75] Inventors: Yu-Chin Lai, Pittsford; Edmond T. Quinn, Rochester, both of N.Y.

[73] Assignee: Bausch & Lomb Incorporated, Rochester, N.Y.

[21] Appl. No.: 09/079,780

[22] Filed: May 15, 1998

[51] Int. Cl.$^6$ .................................... C08G 77/04
[52] U.S. Cl. ................ 528/28; 528/26; 528/27; 525/100; 526/279; 351/160 H
[58] Field of Search ................ 528/26, 27, 28; 525/100; 526/279; 351/160 H

[56] References Cited

U.S. PATENT DOCUMENTS

| | | | |
|---|---|---|---|
| 5,034,461 | 7/1991 | Lai et al. | 525/100 |
| 5,128,434 | 7/1992 | Lai et al. | 528/65 |
| 5,523,373 | 6/1996 | Esselborn et al. | 528/26 |
| 5,532,398 | 7/1996 | Wolter et al. | 528/26 |

*Primary Examiner*—Melvyn I. Marquis
*Attorney, Agent, or Firm*—John E. Thomas

[57] ABSTRACT

Thermoplastic silicone-containing composition are useful as a hydrogel contact lens material. The compositions are based on polymers including a siloxane segment and a highly hydrophilic segment.

32 Claims, No Drawings

THERMOPLASTIC SILICONE-CONTAINING HYDROGELS

BACKGROUND OF THE INVENTION

The present invention generally relates to thermoplastic silicone-containing materials useful as a hydrogel contact lens material.

Hydrogels represent a desirable class of materials for many biomedical applications including contact lenses. Hydrogels are hydrated, cross-linked polymeric system that contain water in an equilibrium state. Silicone hydrogels are a known class of hydrogels and are characterized by the inclusion of a silicone-containing material. Typically, a silicone-containing monomer is copolymerized by free radical polymerization with a hydrophilic monomer, with either the silicone-containing monomer or the hydrophilic monomer functioning as a crosslinking agent (a crosslinker being defined as a monomer having multiple polymerizable functionalities) or a separate crosslinker may be employed. Such silicone hydrogels, based on polyurethanes, are disclosed in U.S. Pat. No. 5,034,461, for example. An advantage of silicone hydrogels over non-silicone hydrogels is that the silicone hydrogels typically have higher oxygen permeability due to the inclusion of the silicone-containing monomer. Because such hydrogels are based on monomers polymerizable by free radical, these materials are thermosetting polymers.

The present invention provides a class of silicone hydrogel materials that are thermoplastic. These materials can be cast into articles such as contact lenses by methods other than free radical polymerization, for example, by compression molding or injection molding. The materials include a silicone-containing moiety and a highly hydrophilic moiety, thus the materials exhibit relatively high oxygen permeability while being able to absorb and retain water. When cast into contact lenses, the materials are optically clear, and the materials are stable at relatively high temperatures.

SUMMARY OF THE INVENTION

This invention provides a thermoplastic silicone-containing composition, useful as a hydrogel contact lens material, represented by the formula (I):

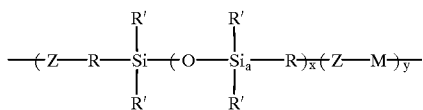

wherein
M is a hydrophilic radical derived from a hydrophilic ethylenically unsaturated monomer and having a molecular weight of about 500 to 5000;
each R is independently selected from an alkylene group having 1 to 10 carbon atoms wherein the carbon atoms may include ether, urethane or ureido linkages therebetween;
each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween;
a is an integer equal to or greater than 1;
each Z is independently a divalent urethane or ureido segment;
and x is greater than or equal to 1, and y is greater than or equal to 1.

The invention further relates to contact lenses formed on the above-described silicone-containing composition.

DETAILED DESCRIPTION OF PREFERRED EMBODIMENTS

The thermoplastic polymers of this invention include units of the general formula (I), represented above.

The thermoplastic polymers include a silicone-containing segment. More particularly, this silicone-containing segment is derived from polysiloxanes endcapped with hydroxyl or amino radicals:

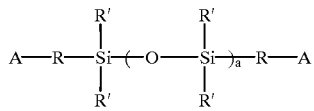

wherein each A is hydroxyl or amino radical;
each R is independently selected from an alkylene group having 1 to 10 carbon atoms wherein the carbon atoms may include ether, urethane or ureido linkages therebetween;
each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween, and
a is an integer equal to or greater than 1.

Preferred R' radicals include: alkyl groups, phenyl groups, fluoro-substituted alkyl groups and alkenyl groups. Preferred R' radicals are alkylene, preferably butylene. Preferably, a is about 10 to about 100, more preferably about 15 to about 60.

The thermoplastic polymers also include a highly hydrophilic segment, represented by the "M" moiety in Formula (I). More particularly, this hydrophilic segment can be prepared from an ethylenically unsaturated hydrophilic monomer, preferably an amino-substituted (meth)acrylamide or an N-vinyl lactam. Most preferred hydrophilic monomers are N,N-dimethylacrylamide (DMA) and N-vinyl pyrrolidone (NVP). The "M" moiety in Formula (I) is conveniently derived from prepolymers of the aforementioned hydrophilic monomers, such prepolymers being endcapped with hydroxyl or amino radicals as in Formula (II):

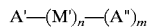

wherein:
A' is derived from a chain transfer agent and includes a terminal hydroxyl or amino radical;
A" is derived from an ethylenically unsaturated monomer that includes a terminal hydroxyl or amino radical;
M' is derived from the hydrophilic ethylenically unsaturated monomer, such as the preferred DMA and NVP;
m is an integer of 1 or greater, and preferably 1; and
n is about 5 to 50.

A" in Formula (II) is derived from a chain transfer agent. More specifically, the hydrophilic ethylenically unsaturated monomer M' is polymerized in the presence of the chain transfer agent which serves to control the molecular weight of the resultant polymer and provides hydroxy- or amino-functionality to the resultant polymer. Suitable chain transfer agents include mercapto alcohols (also referred to as hydroxymercaptans) and aminomercaptans. Preferred chain transfer agents include 2-mercaptoethanol and 2-aminoethanethiol. Accordingly, the chain transfer agent forms a terminal end of the hydrophilic polymer, with the hydroxy radical (in the case of a mercapto alcohol) providing the resultant polymer with terminal hydroxyl functionality, and the amino radical (in the case of a aminomercaptan) providing the resultant polymer with terminal amino functionality. Generally, the molar ratio of chain transfer agent to this hydrophilic monomer precursor will be about 1:5 to about 1:100.

The ethylenically unsaturated hydrophilic monomer and the chain transfer agent are copolymerized with another monomer having ethylenic unsaturation and a hydroxy- or amino-radical (A" in Formula (II)). Accordingly, this additional monomer is also copolymerized with the hydrophilic monomer and also provides terminal hydroxy- or amino-functionality to the resultant polymer. Suitable monomers include alcohol esters of (meth)acrylic acid such as 2-hydroxyethylmethacrylate (Hema), allyl alcohol, amino esters of (meth)acrylic acid such as 2-t-butyl-aminoethylmethacrylate, and allylamine. Generally, this hydroxy- or amino-containing ethylenically unsaturated monomer will be at a 1:1 molar ratio to the chain transfer agent.

Representative reaction schemes for these hydrophilic precursors of Formula (II) are illustrated as follows:

nDMA+HOCH$_2$CH$_2$SH+CH$_2$=C(CH$_3$)COOCH$_2$CH$_2$OH→HOCH$_2$CH$_2$S-(DMA)n—CH$_2$C(CH$_3$)COOCH$_2$CH$_2$OH nDMA+H$_2$NCH$_2$CH$_2$SH+CH$_2$=C(CH$_3$)COOCH$_2$CH$_2$NHC(CH$_3$)$_3$→H$_2$NCH$_2$CH$_2$S-(DMA)$_n$—CH$_2$C(CH$_3$)COOCH$_2$CH$_2$NH C(CH$_3$)$_3$ nNVP+HOCH$_2$CH$_2$SH+CH$_2$=CHCH$_2$OH→HOCH$_2$CH$_2$S-(NVP)n—CH$_2$CH$_2$CH$_2$OH nNVP+H$_2$NCH$_2$CH$_2$SH+CH$_2$=CHCH$_2$NH$_2$→H$_2$NCH$_2$CH$_2$S-(NVP)n—CH$_2$CH$_2$CH$_2$NH$_2$ where (DMA)$_n$ is

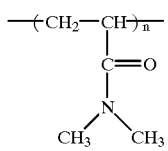

and (NVP)$_n$ is

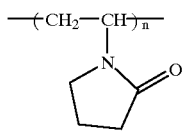

Such synthesis methods will generally involve thermal polymerization by methods generally known in the art. Representative detailed syntheses of preferred precursors of Formula (II) are described in the Examples.

The aforementioned silicone-containing segment and hydrophilic segment are linked via "hard" segments, represented by "Z" in Formula (I). These "hard" segments are based on urethane/urea chemistry. More specifically, these "hard" segments are based on diisocyanates that react with hydroxyl- or amino-functionality, respectively, of the silicone-containing segments and hydrophilic segments.

Generally, any diisocyanate may be employed. These diisocyanates may be aliphatic or aromatic, and include alky, alkyl cycloalkyl, cycloalkyl, alkyl aromatic and aromatic diisocyanates preferably having 6 to 30 carbon atoms in the aliphatic or aromatic moiety. Specific examples include isophorone diisocyanate, hexamethylene-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diusocyanate. Other examples are diisocyanates which are the reaction product of a diisocyanate and a short-chain diol at a 2:1 molar ratio.

The "hard" segments forming the "Z" moiety in Formula (I) are preferably further based on a relatively low molecular weight diol or glycol. These include an alkyl diol, a cycloalkyl diol, an alkyl cycloalkyl diol, an aryl diol or an alkylaryl diol having 1 to 40 carbon atoms and which may contain ether, thio or amine linkages in the main chain. Specific examples include 2,2-(4,4'-dihydroxydiphenyl) propane (bisphenol-A), 4,4'-iso-propylidine dicyclohexanol, ethoxylated and propoxylated bisphenol-A, 2,2-(4,4'-dihydroxydiphenyl)pentane, 1,1'-(4,4'-dihydroxydiphenyl)-p-diisopropyl benzene, 1,3-cyclohexane diol, 1,4-cyclohexane diol, 1-4-cyclohexane dimethanol, neopentyl glycol, 1,4-butanediol, 1,3-propanediol, 1,5-pentanediol, diethylene glycol and triethylene glycol. Especially preferred are alkyl and oxyalkylene diols having 1 to 10 carbon atoms.

Accordingly, a preferred class of thermoplastic polymers may be represented by the formula (III):

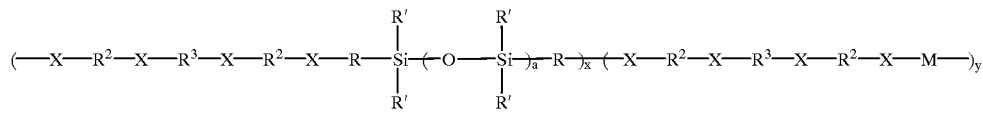

wherein:
M is the hydrophilic radical derived from a hydrophilic ethylenically unsaturated monomer, as in Formula (I);
R, R' and a are as previously defined;
each X is independently a urethane or ureido linkage;
each R$^2$ is independently a divalent residue of a diisocyanate;
each R$^3$ is independently a divalent residue of a diol or glycol;

and x is greater than or equal to 1, and y is greater than or equal to 1.

Methods for forming thermoplastic urethane or urea polymers are known in the art, and representative synthesis is illustrated in the Examples.

The polymers can be cast into shaped articles, such as contact lenses, by methods such as injection or compression molding. More specifically, the polymers are charged to a mold cavity having the desired shape of a contact lens and then cured to form a thermoplastic polymer, with the addition of heat to facilitate curing if desired. The mold may be formed of two mold sections, one mold section shaped to form the anterior lens surface and the other mold section shaped to form the posterior lens surface two mold sections, and may be either plastic or metal. A polymerization initiator may be included in the material charged to the mold to facilitate curing, for example, thermal curing.

When used in the formation of contact lenses, it is preferred that the subject thermoplastic polymers, when hydrated, form hydrogels having water contents of at least 5 weight percent and more preferably at least 10 weight percent. Furthermore, it is preferred that such hydrogels have a Young's modulus of elasticity from about 20 $g/mm^2$ to about 150 $g/mm^2$, and more preferably from about 30 $g/mm^2$ to about 100 $g/mm^2$, and a tear strength of at least 2 g/mm.

As an illustration of the present invention, several examples are provided below. These examples serve only to further illustrate various preferred embodiments of the invention and should not be construed as limiting the invention.

EXAMPLE 1

Synthesis of Hydroxyl-Terminated 12Repolymer of Formula (II) Based on DMA

To a dried 500-ml round bottom flask was added N,N-dimethylacrylamide (DMA, 79.2 g/0.799 mole), 2-hydroxyethylmethacrylate (Hema, 13 g/0.0998 mole) and anhydrous tetrahydrofuran (THF, 200 ml). The contents were flushed with nitrogen and 2-mercaptoethanol (7.8 g/0.0998 mole) and 2,2-azobisisobutyronitrile (AIBN, 0.8 g/0.5 mole % of DMA) were added. The mixture was heated at 60° C. for 5 hours and poured into a beaker containing ether to precipitate the product. The hydroxyl-equivalent weight as determined by titration (addition of excess isophorone diisocyanate to react with OH groups in the prepolymer, and then addition of excess di-n-butylamine to react with isocyanate groups, followed by titration with HCl) was 480.

EXAMPLE 2

Synthesis of Thermoplastic Polymer of Formula (I)

To a dried 3-neck round bottom 500-ml flask was added the hydroxyl-terminated prepolymer of Example 1 (4.8284 g/0.00504 mole) and 30 ml of dry methylene chloride. The mixture was stirred until complete dissolution. Then, α, ω-bis(hydroxybutyl) polydimethylsiloxane having an average molecular weight of about 5000 (PDMS, 20.3886 g/0.00504 mole), diethylene glycol (2.1441 g/0.0202 mole), isophorone diisocyanate (IPDI, 6.7243 g/0.03025 mole), dibuytltin dilaurate (0.1032 g) and 200 ml of methylene chloride were added. The contents were refluxed under nitrogen. Samples of the reaction product were taken periodically for measurement of IR spectrum, and the reaction was terminated after about 120 hours when the isocyanate peak (about 2270 $cm^{-1}$) disappeared from IR spectrum of the reaction product. The solvent was then stripped with methylene chloride under vacuum to give the polymeric product (number average molecular weight Mn 11400, molecular weight MW 43175 using polystyrene standard).

EXAMPLE 3

Film Samples

Before stripping the product solution of Example 2 in methylene chloride, films were cast from this solution onto glass plates, followed by evaporating the solvent under vacuum. The films were optically clear. The films were placed in borate buffered saline solution to yield hydrogel films. The hydrogel films were optically clear and had a water content of 22 weight percent. Mechanical properties of the films were determined on an Instron Model 4500 using ASTM methods 1708 and 1938, tensile modulus of 63 $g/mm^2$ and a tear strength of 20 $g/mm^2$. Oxygen permeability was 269 Dk units.

The hydrogel films were dried and then heated in water at 80° C. for 4 hours. After re-drying, there was no loss in weight, indicating the hydrogels were stable up to this temperature.

EXAMPLE 4

Contact Lens Casting

The thermoplastic resin obtained in Example 2 was ground into a fine powder. It was then poured into an a plastic mold made of Ultem™ resin, having a molding surface to provide an anterior contact lens surface, and then another plastic mold having a molding surface to provide a posterior contact lens surface was placed on top of each anterior mold to form a molding cavity therebetween. The two molds were clamped between plates, and then placed between two preheated platens and compressed at 147° C. for 1 hour. The lenses were released from the molds and placed in borate buffered saline. All hydrogel lenses thus obtained were visually clear.

The following examples illustrate synthesis of other hydrophilic prepolymers suitable for the subject thermoplastic polymers.

EXAMPLE 5

Synthesis of Hydroxyl-Terminated Prepolymer of Formula (II) Based on DMA

To a dried 500-ml round bottom flask was added N,N-dimethylacrylamide (DMA, 94.78 g/0.95 mole), 2-hydroxyethylmethacrylate (Hema, 3.27 g/0.0251 mole) and anhydrous tetrahydrofuran (THF, 200 ml). The contents were flushed with nitrogen and 2-mercaptoethanol (1.97 g/0.0251 mole) and 2,2-azobisisobutyronitrile (AIBN, 0.8 g/0.5 mole % of DMA) were added. The mixture was heated at 60° C. for 20 hours and poured into a beaker containing ether to precipitate the product. The product was vacuum dried to yield 92 grams. Size exclusion chromatography indicated Mn 2926, MW 7466, with a polydispersity of 2.55. The hydroxyl-equivalent weight as determined by titration (addition of excess isophorone diisocyanate to react with OH groups in the prepolymer, and then addition of excess di-n-butylamine to react with isocyanate groups, followed by titration with HCl) was 1870.

EXAMPLE 6

Synthesis of Hydroxyl-Terminated Prepolymer of Formula (II) Based on NVP

A prepolymer was prepared as in Example 5 employing the following amounts of reactants: N-vinylpyrrolidone (NVP), 86.43 g/0.78 mole; allyl alcohol, 5.79 g/0.0997 mole; mercaptoethanol, 7.79 g/0.099 mole; and AIBN, 0.5 mole % of NVP). The reactants were polymerized for 150 hours, and the hydroxyl-equivalent weight as determined by titration was 594.

EXAMPLE 7
Synthesis of Hydroxyl-Terminated Prepolymer of Formula (II) Based on DMA A polymer was prepared as in Example 5 employing the following amounts of reactants: N,N-dimethylacrylamide (DMA, 100 g/1.009 mole); 2-hydroxyethyl methacrylate (Hema, 10.69 g/0.0841 mole); 2-mercaptoethanol (6.57 g/0.0841 mole); and 2,2-azobisisobutyronitrile (AIBN, 1.64 g/0.01 mole). The product was vacuum dried to yield 109.6 grams. Size exclusion chromatography indicated Mn 1483, MW 3416, with a polydispersity of 2.30.

Many other modifications and variations of the present invention will be evident to the skilled practitioner in the field in light of the teachings herein. It is therefore understood that, within the scope of the claims, the present invention can be practiced other than as specifically described.

We claim:

1. A thermoplastic polymer including units of the formula:

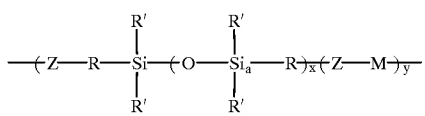

wherein
M is a hydrophilic radical derived from a hydrophilic ethylenically unsaturated monomer and having a molecular weight of about 500 to 5000;
each R is independently selected from an alkylene group having 1 to 10 carbon atoms wherein the carbon atoms may include ether, urethane or ureido linkages therebetween;
each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween;
a is an integer equal to or greater than 1;
each Z is independently a divalent urethane or ureido segment;
and x is greater than or equal to 1, and y is greater than or equal to 1.

2. The thermoplastic polymer of claim 1, wherein M is derived from an N-substituted (meth)acrylamide.

3. The thermoplastic polymer of claim 2, wherein M is derived from N,N-dimethylacrylamide.

4. The thermoplastic polymer of claim 1, wherein M is derived from an N-vinyl lactam.

5. The thermoplastic polymer of claim 4, wherein M is derived from N-vinyl pyrrolidone.

6. The thermoplastic polymer of claim 1, wherein M is derived from the prepolymer A'—(M')$_n$—(A")$_m$ wherein:

A' is derived from a chain transfer agent and includes a terminal hydroxyl or amino radical;
A' is derived from an ethylenically unsaturated monomer that includes a terminal hydroxyl or amino radical;
M' is derived from the hydrophilic ethylenically unsaturated monomer; and
n is about 5 to 50 and m is an integer of 1 or greater.

7. The thermoplastic polymer of claim 6, wherein (M')$_n$ has the formula:

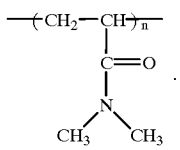

8. The thermoplastic polymer of claim 6, wherein (M')$_n$ has the formula:

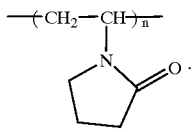

9. The thermoplastic polymer of claim 1, including units of the formula (III)

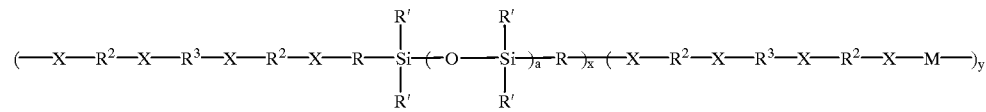

wherein:
M, R, R, a, x and y are as defined in claim 1;
each X is independently a urethane or ureido linkage;
each R$^2$ is independently a divalent residue of a diisocyanate; and
each R$^3$ is independently a divalent residue of a diol or glycol.

10. The thermoplastic polymer of claim 9, wherein R$^3$ is the divalent residue of a diol or glycol having 1 to 40 carbon atoms.

11. The thermoplastic polymer of claim 10, wherein R$^3$ is the divalent residue of an alkylene or oxyalkylene diol having 1 to 10 carbon atoms.

12. The thermoplastic polymer of claim 11, wherein R$^3$ is the divalent residue of diethylene glycol.

13. The thermoplastic polymer of claim 9, wherein each R$^2$ is independently a divalent residue of an alkyl, alkyl cycloalkyl, cycloalkyl, alkyl aromatic or aromatic diisocyanate having 6 to 30 carbon atoms in the aliphatic or aromatic moiety.

14. The thermoplastic polymer of claim 13, wherein R$^2$ is a selected from the group consisting of isophorone diisocyanate, hexamethylene-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diisocyanate.

15. The thermoplastic polymer of claim 14, wherein $R^2$ is a divalent residue of isophorone diisocyanate.

16. A hydrogel that is the hydrated product of the polymer of claim 1.

17. A contact lens formed of a thermoplastic polymer including units of the formula:

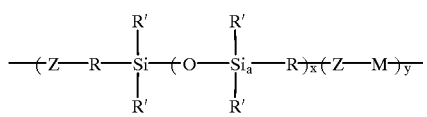

wherein
M is a hydrophilic radical derived from a hydrophilic ethylenically unsaturated monomer and having a molecular weight of about 500 to 5000;
each R is independently selected from an alkylene group having 1 to 10 carbon atoms wherein the carbon atoms may include ether, urethane or ureido linkages therebetween;
each R is independently selected from hydrogen, monovalent hydrocarbon radicals or halogen substituted monovalent hydrocarbon radicals wherein the hydrocarbon radicals have 1 to 18 carbon atoms which may include ether linkages therebetween;
a is an integer equal to or greater than 1;
each Z is independently a divalent urethane or ureido segment;
and x is greater than or equal to 1, and y is greater than or equal to 1.

18. The contact lens of claim 17, wherein M is derived from an N-substituted (meth)acrylamide.

19. The contact lens of claim 18, wherein M is derived from N,N-dimethylacrylamide.

20. The contact lens of claim 17, wherein M is derived from an N-vinyl lactam.

21. The contact lens of claim 20, wherein M is derived from N-vinyl pyrrolidone.

22. The contact lens of claim 17, wherein M is derived from the prepolymer

A'—(M')$_n$—(A")$_m$ wherein:
A' is derived from a chain transfer agent and includes a terminal hydroxyl or amino radical;
A" is derived from an ethylenically unsaturated monomer that includes a terminal hydroxyl or amino radical;
M' is derived from the hydrophilic ethylenically unsaturated monomer; and
n is about 5 to 50 and m is an integer of 1 or greater.

23. The contact lens of claim 22, wherein (M')$_n$ has the formula:

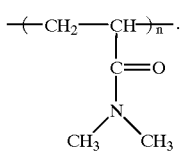

24. The contact lens of claim 22, wherein (M')$_n$ has the formula:

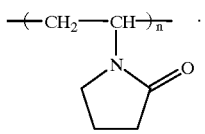

25. The contact lens of claim 17, including units of the formula (III)

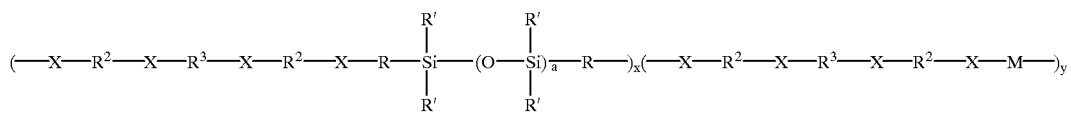

wherein:
M, R, R', a, x and y are as defined in claim 17;
each X is independently a urethane or ureido linkage;
each $R^2$ is independently a divalent residue of a diisocyanate; and
each $R^3$ is independently a divalent residue of a diol or glycol.

26. The contact lens of claim 25, wherein $R^3$ is the divalent residue of a diol or glycol having 1 to 40 carbon atoms.

27. The contact lens of claim 26, wherein $R^3$ is the divalent residue of an alkylene or oxyalkylene diol having 1 to 10 carbon atoms.

28. The contact lens of claim 27, wherein $R^3$ is the divalent residue of diethylene glycol.

29. The contact lens of claim 25, wherein each $R^2$ is independently a divalent residue of an alkyl, alkyl cycloalkyl, cycloalkyl, alkyl aromatic or aromatic diisocyanate having 6 to 30 carbon atoms in the aliphatic or aromatic moiety.

30. The contact lens of claim 29, wherein $R^2$ is a selected from the group consisting of isophorone diisocyanate, hexamethylene-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diisocyanate.

31. The contact lens of claim 30, wherein $R^2$ is a divalent residue of isophorone diisocyanate.

32. The contact lens of claim 17, which is a hydrogel contact lens.

* * * * *

UNITED STATES PATENT AND TRADEMARK OFFICE
CERTIFICATE OF CORRECTION

PATENT NO. : 5,969,076
DATED : October 19, 1999
INVENTOR(S) : Yu-Chin Lai, et. al.

It is certified that error appears in the above-identified patent and that said Letters Patent is hereby corrected as shown below:

In Column 7, line 24, "Si$_a$" should read -- Si)$_a$ -- .

In Column 9, line 18, "Si$_a$" should read -- Si)$_a$ -- .

In Column 9, line 31, "each R" should read -- each R' -- .

Signed and Sealed this

Twenty-second Day of August, 2000

*Attest:*

*Attesting Officer*

Q. TODD DICKINSON
*Director of Patents and Trademarks*